(12) United States Patent
Conner et al.

(10) Patent No.: US 11,388,176 B2
(45) Date of Patent: Jul. 12, 2022

(54) VISUALIZATION TOOL FOR REAL-TIME NETWORK RISK ASSESSMENT

(71) Applicant: SonicWALL Inc., Milpitas, CA (US)

(72) Inventors: F. William Conner, Dallas, TX (US); MinhDung Joe NguyenLe, San Ramon, CA (US); Atul Dhablania, San Jose, CA (US); Richard Chio, Union City, CA (US); Justin Jose, San Jose, CA (US); Lalith Kumar Dampanaboina, Milpitas, CA (US)

(73) Assignee: SONICWALL INC., Milpitas, CA (US)

( * ) Notice: Subject to any disclaimer, the term of this patent is extended or adjusted under 35 U.S.C. 154(b) by 251 days.

(21) Appl. No.: 16/863,933

(22) Filed: Apr. 30, 2020

(65) Prior Publication Data

US 2021/0168157 A1   Jun. 3, 2021

Related U.S. Application Data

(60) Provisional application No. 62/943,122, filed on Dec. 3, 2019.

(51) Int. Cl.
*H04L 9/40* (2022.01)
*H04L 43/045* (2022.01)
*H04L 43/028* (2022.01)

(52) U.S. Cl.
CPC ........ *H04L 63/1408* (2013.01); *H04L 43/028* (2013.01); *H04L 43/045* (2013.01); *H04L 63/145* (2013.01)

(58) Field of Classification Search
CPC . H04L 63/1408; H04L 43/028; H04L 63/145; H04L 43/045; H04L 63/1416
See application file for complete search history.

(56) References Cited

U.S. PATENT DOCUMENTS

| | | | |
|---|---|---|---|
| 9,009,827 B1 * | 4/2015 | Albertson | H04L 63/14 726/22 |
| 10,701,086 B1 * | 6/2020 | Mushtaq | G06K 9/6267 |
| 2018/0191771 A1 * | 7/2018 | Newman | G06F 21/552 |
| 2021/0165879 A1 | 6/2021 | Duo | |
| 2021/0194915 A1 | 6/2021 | Duo | |

* cited by examiner

*Primary Examiner* — Ali S Abyaneh
(74) *Attorney, Agent, or Firm* — Polsinelli LLP (57) ABSTRACT

The present disclosure relates to methods and apparatus that collect data regarding malware threats, that organizes this collected malware threat data, and that provides this data to computers or people such that damage associated with these software threats can be quantified and reduced. The present disclosure is also directed to preventing the spread of malware before that malware can damage computers or steal computer data. Methods consistent with the present disclosure may optimize tests performed at different levels of a multi-level threat detection and prevention system. As such, methods consistent with the present disclosure may collect data from various sources that may include endpoint computing devices, firewalls/gateways, or isolated (e.g. "sandbox") computers. Once this information is collected, it may then be organized, displayed, and analyzed in ways that were not previously possible.

20 Claims, 7 Drawing Sheets

VISUALIZATION TOOL FOR REAL-TIME NETWORK RISK ASSESSMENT

CROSS-REFERENCE TO RELATED APPLICATION

The present application claims the priority benefit of U.S. provisional application No. 62/943,122 filed Dec. 3, 2019, the disclosure of which is incorporated herein by reference.

BACKGROUND OF THE INVENTION

Field of Invention

The present disclosure generally relates to quantifying the spread of malware through computer networks. More specifically, the present disclosure relates to identifying anti malware assets in different locations that are currently detecting specific types of malware.

Description of the Related Art

Computer systems and computer networks today are vulnerable and may be exploited by different types of software threats. Such software threats are commonly referred to as malware. Malware may come in any forms or types that may be classified as ransomware, viruses, computer worms, Trojans, adware, and spyware. Malware includes all software written with executable code directed to secretly manipulating, altering, disrupting, and/or damaging computer systems or computer data. Malware attacks may target computers belonging to individuals or organizations for social, political, economic, and/or monetization purposes. Malware is typically distributed by parties with nefarious intent. Malware is commonly used steal or destroy computer data or to snoop or spy the actions of a user when the user operates a computer. Malware, such as a computer virus, may also to self-replicate when spreading to other computers. Malware may also be used to steal personal or financial information (spyware/Trojans), or to blackmail computer users by denying access to their own data unless or until a fee is paid (ransomware). Malware can reside in sets of data packets transferred between computers or can reside in a data storage device in the form of a file or other data, for example.

As mentioned above, viruses are software programs that can often replicate themselves as these viruses attempt and infect computers, to disrupt the operations of computers, or destroy computer data. Viruses can be used to gain administrative control of a computer to force computers to download and execute other malicious programs, spread infection to other computers, or destroy sensitive user data. Trojans are often designed to extract sensitive data from a computer or computer network. Trojans may take control of an infected system and open a back door for an attacker to access later. Trojans are often used the in creation of botnets. Spyware is typically used to infect web browsers, sometimes making them nearly inoperable. Spyware may sometimes be disguised as a legitimate software application that appears to provide a benefit while secretly recording behavior and usage patterns. As such, malware is typically distributed by parties with nefarious intent. Furthermore, newly developed malware is increasingly difficult to identify. Frequently, until a particular sort of malware has been identified and characterized, conventional techniques that identify whether a communication includes malware can miss detecting the presence of that malware in the communication. This may occur when information in one or more received data packets is hidden or when the malware is not identifiable by a signature associated with the information in the received data packets.

Presently, thousands of new malware samples are discovered all over the internet each day. According to the popular malware detection website Virustotal.com, an average number of unique malware samples identified daily are above 800,000. This huge number of malware samples traversing the internet poses a significant challenge for detection using known pattern matching methods employed by traditional anti-malware solutions. Significantly, almost all the new malware samples observed each day are actually repackaged versions of known malware. Individuals that generate malware today often obfuscate the presence of malicious code by packing it within other executable code or by compressing it. In certain instances this is performed using binary packing software or a form of software that is referred to as "protector" software. This packing or "protecting" function may reorganize or manipulate a piece of original malware code into a structure that cannot be detected using conventional packet scanning. As such, repackaged versions of old malware can successfully evade detection when conventional scanning techniques such as deep packet inspection (DPI) are used. DPI relies on pattern matching data included in a set of data packets with attributes associated with or signatures generated from previously identified malicious code.

When a repackaged malware is received, it may be executed by a computing device. In certain instances malware reveals (unpacks) its internal malicious code and associated data in process memory after which the malicious code may then executed by a processor at the computing device. The difficulty in detecting repackaged malware is compounded by the fact that memory extraction of code and data does not generate any operating system events, such as a system call or call-backs which can be intercepted externally. Hence, malicious code can silently be extracted, executed and removed from memory.

Since malware can and is used by those to steal or destroy computer data and since repackaged malware can avoid detection when conventional techniques are used, what are needed are detection methods that do not depend on the content of a set of computer data. Because of the threats posed by malware today, companies like Sonic Wall Inc. collect data from various sources when tracking what forms of malware are impacting computers in different regions of the World. Knowing what types of malware that are currently being deployed in particular locations can provide a way to help prevent the spread of that malware to computers in different regions of the World.

While data are currently being collected regarding locations where certain particular types of malware are currently infecting computers, organizing and reviewing this data provides those chartered with the responsibility of preventing the spread of malware with logistical difficulties. Simply put, the volume of data generated each day regarding the distribution of malware throughout the World is so large (hundreds of thousands to millions of instances) that identifying the extent of a particular threat is very difficult. Furthermore, the tracking and analysis of vast numbers of different types of malware make the tracking on malware by persons impossible. What are needed are new methods and apparatus that collect data regarding malware threats. What are also needed are view ways of organizing and presenting malware threat data such that the vast amount of malware threat data can be acted upon to reduce the impact of malware being distributed throughout the World. Identifying the extent of the spread of malware may also help identify how to improve programs or systems that identify, block, isolate, or destroy malware. Because of this, new methods and systems that process threat data such that this threat data can be easily evaluated are also required.

SUMMARY OF THE CLAIMED INVENTION

The presently claimed invention relates to a system, a method, and a non-transitory computer readable storage medium executing functions consistent tracking and preventing the spread of malware. A system consistent with the present disclosure may include a computer that evaluates malware test data received from computing devices test computer data for the presence of malware. As such, this system may include a first set of computers that form a first test layer and a second set of computers that form a second test layer. Computers associated with the first test layer may perform a first set of anti-malware tests and computers associated with the second test layer may perform a second set of anti-malware tests. Test data sent from the first set of computers and sent from the second set of computers may be received by the evaluation computer such that the evaluation computer can identify malware types that were detected by the first and the second set of computers. Evaluation of this test data may be used to generate visualizations that illustrate a first set and a second set of malware test vectors, that identify a first set of malware types detected by the first set of computers, and that identify a second set of malware types detected by the second set of computers. The evaluation computer of the presently claimed system may also display the generated visualization on a display and that display may be updated continuously as additional test data is received.

A method consistent with the present disclosure may receive a first set of test data from a first set of computing devices and may receive a second set of test data from a second set of computing devices. Here again the first set of computing devices may be associated with a first test level and the second set of computing devices may be associated with a second test level. After the test data is received, the presently claimed method may identify sets of malware types that were detected by the first and the second set of computing devices. Here again an evaluation of this test data may be used to generate visualization that illustrates a first set and a second set of malware test vectors, that identify a first set of malware types detected by the first set of computing devices, and that identify a second set of malware types detected by the second set of computing devices. Once generated, this visualization may be displayed on a display. Furthermore, information displayed on the display may be updated continuously as additional test data is received.

When the presently claimed invention is performed as a non-transitory computer-readable storage medium, a computer executing instructions out of a memory may implement a method consistent with the present disclosure that receives a first set of test data from a first set of computing devices and that receives a second set of test data from a second set of computing devices. Here again, the first set of computing devices may be associated with a first test level and the second set of computing devices may be associated with a second test level. After the test data is received, the presently claimed method may identify sets of malware types that were detected by the first and the second set of computers. The processor executing instructions may then use the received test data to generate a visualization that illustrates a first set and a second set of malware test vectors that identify a first set of malware types detected by the first set of computing devices and that identify a second set of malware types detected by the second set of computing devices. Once generated, this visualization may be displayed on a display for review. Furthermore, information displayed on the display may be updated continuously as additional test data is received.

DETAILED DESCRIPTION

The present disclosure relates to methods and apparatus that collect, organize, and analyze data regarding malware threats such that the spread of malware can be quantified and damage associated with that malware can be prevented. The present disclosure is also directed to preventing the spread of malware before that malware can steal data or damage computers. Methods consistent with the present disclosure may be directed to optimizing tests performed at different levels of a multi-level threat detection and prevention system. As such, methods consistent with the present disclosure may collect data from various sources when organizing threat data for display on a display. Such threat data may be collected various sources that may include computers that run anti-malware software, firewalls or gateways that reside at a boundary between a private computer network and a public computer network, wireless mesh nodes that perform an anti-malware function, or from isolated computers that allow received software to operate as the behavior of that software is monitored to see if that software performs a malicious or suspicious act (e.g. a "sandbox" computer). As such, sources of malware data may be identified using apparatus or software that evaluates malware test data received from various sources when quantifying the spread of malware. Since methods consistent with the present disclosure can graphically illustrate the spread of large amounts of malware being distributed throughout the World instantaneously (by depicting hundreds, thousands, to millions of malware intrusions per second), methods and apparatus consistent with the present disclosure can protect computers in ways that were not previously possible.

Methods and apparatus consistent with the present disclosure may receive data that identifies a type of malware, locations where that type of malware are currently being detected, and may identify how fast particular types of malware are spreading. Once malware test data is received, it may be organized by malware type and regions where that malware is being distributed in real-time or in near-real-time. The collected data may also be evaluated to identify a number of incidents of detection of a particular type of malware as that malware spreads to different locations. In certain instances, the operation of one or more different sources of malware data may be disabled (turned off) such that a measure of effectiveness of a particular anti-malware apparatus or software can be identified.

Figure 1:
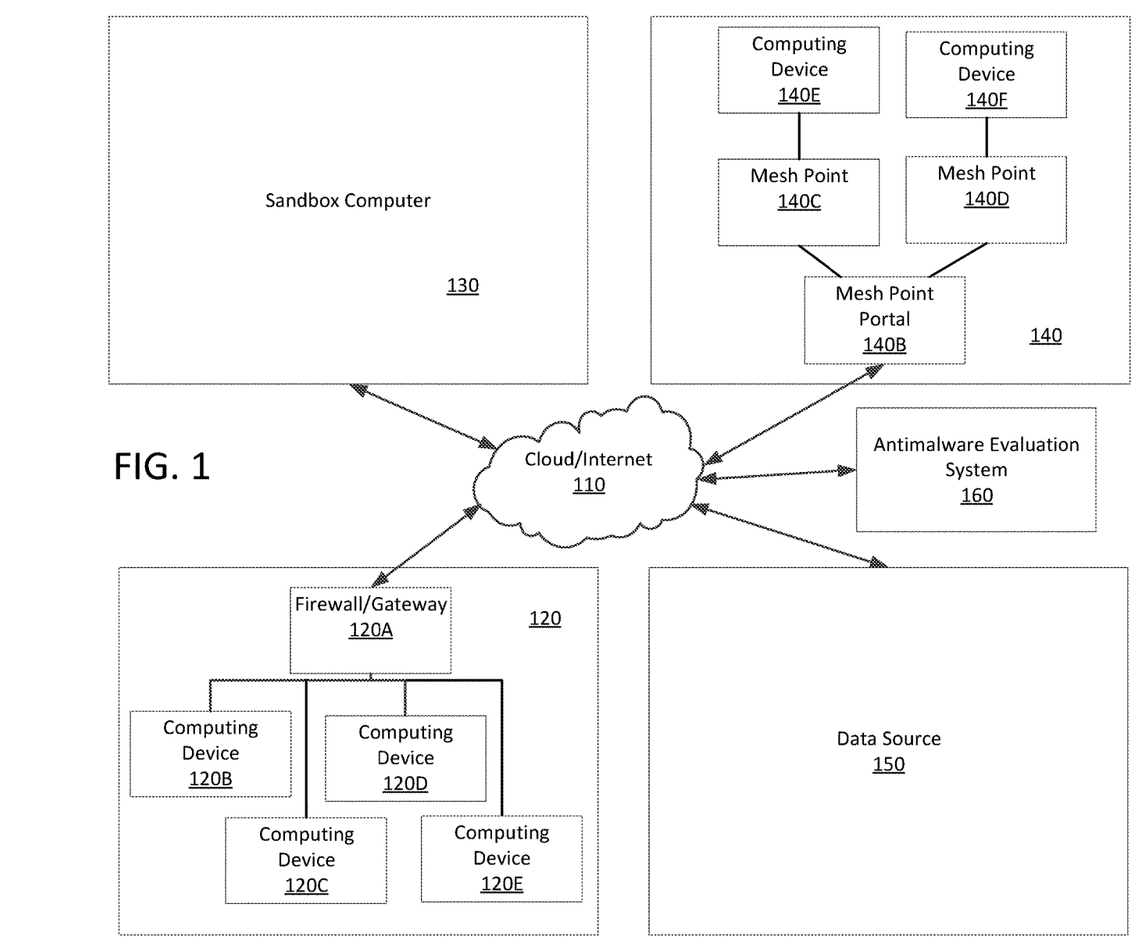
FIG. 1 illustrates a system that may be used to receive and organize locations where particular types of malware are identified and blocked.

FIG. 1 illustrates a system that may be used to receive and organize malware test data when locations where particular types of malware are identified and blocked. FIG. 1 includes cloud or Internet 110, private network 120, sandbox computer 130, wireless mesh network 140, data source 150, and anti-malware evaluation system 160. Private network 120 includes firewall/gateway 120A and computing devices 120B-120E (120B, 120B, 120C, 120D, & 120E). Wireless mesh network 140 may include mesh point portal 140B, mesh points 140C & 140D, and computing devices 140E & 140F.

When computing devices 120B-120E of private network 120 or computing devices 140E-140F attempt to access data residing at or originating from data source 150 via cloud or Internet 110, the requested data may be analyzed for threats. Data source 150 is representative of any number of sources of data such as a web server, email server, file server, cloud storage or the like. As varied as data source 150 may be, the data retrieved from that source is equally diverse. In that regard, data from data source 150 may include webpages, data in webpages, email, video, audio, and data files, file attachments such as word documents or PDFs, or servers or gateways allowing access to other networks and credentials that might be exchanged with respect to accessing the same.

Data retrieved from or delivered by data source 150 may encompass one or more forms of malware. As such, inbound data from data source 150 or a proxy thereof may be tested at firewall/gateway 120A utilizing one or more anti-malware apparatus or software implementations. Similar testing may occur at the likes of wireless mesh portal 140B or at computing devices 120B-120E, one or more of which may be configured with or otherwise have access to anti-malware apparatus or software implementations, including sandbox computer 130 or anti-malware evaluation system 160.

In certain instances, data from a data request may be sent to sandbox computer 130 that may perform a series of runtime tests on received data. Such a request may be passed to sandbox computer by firewall/gateway 120A, mesh portal 140B, or one or more of computing devices 120B-E or meshed computing devices 140E-F. Sandbox computer 130 may retrieve the requested data when preparing to perform the runtime tests from a quarantine data retention source (not shown) or through a further request to data source 150. Sandbox computer 130 may examine runtime tests without the threat of infecting a larger network (like network 120) and then pass the results of said analyses to an anti-malware evaluation system 160 for use in the future or to otherwise aid in inoculating a network from inbound malware traffic.

Data received from data source 150 may also be tested by firewall/gateway 120A or may be tested by computers at wireless mesh network 140. In certain instances, individual computing devices that generate data requests may also perform tests on received data. As such, computing devices 120B-120E and 140E-140F may test received data when looking for malware.

Data from tests performed by firewall/gateway 120A, by sandbox computer 130, by computers at wireless mesh network 140, or by requesting computing devices 120B-120E and 140E-140F may be passed to or operate in conjunction with anti-malware evaluation system 160. This data may be passed to anti-malware evaluation system 160 in real time or in near-real time from each respective device that performs anti-malware tests. The test data passed to anti-malware evaluation system 160 may include a test result, information that identifies data source 150, or information that identifies a location where a data request originated some or all of which may have been generated in conjunction or as a result of runtime testing at sandbox computer 130.

Evaluation system 160 may then identify a network location affected by the malware, identify malware types affecting particular parts of a network, identify a test type or test location, and/or identify a time when a particular type of malware was detected. Analysis performed at anti-malware evaluation system 160 may then analyze data received throughout a region of the World when identifying types of malware, specific tests that detected that malware, locations where requests for the malware originated, and sources of malware affecting that World region. Anti-malware evaluation system 160 may then generate a visualization that graphically illustrates dynamic conditions as different types of malware are detected around the World.

The terms "access point" or "wireless access point" in the present disclosure refer to a device that may be wirelessly communicatively coupled to a computer directly with or without wireless communications passing through another wireless device. The terms "access point" or "wireless access point" may refer to either a mesh portal or mesh point. The term "mesh portal" may relate to a wireless device that performs functions that a mesh point need not perform. Both mesh portals and mesh points may perform functions consistent with a wireless access point because both mesh portals and mesh points may act as a wireless access point that directly wirelessly communicates with a computer such as computing device 140E of FIG. 1.

The terms "mesh node" in the present disclosure may be used to refer to either a mesh portal or a mesh point that uses wireless communications to transmit and receive wireless computer network messages and data. A mesh portal may be configured to transmit and receive data network communication traffic between two different types of computer networks, for example, between a network that communicates over wires and a network that uses wireless 802.11 signals. As such, mesh point portal 140B of FIG. 1 may communicate via cloud/Internet 110 using Ethernet connections and may communicate with mesh points 140C-D using 802.11 compliant signals. Alternatively or additionally, a mesh portal (e.g. 140B of FIG. 1) may transmit and receive data network communication traffic between a cellular network and an 802.11 network. While mesh portals include different functionality as compared to a mesh point, certain mesh points may be configured to assume the role of a mesh portal.

Typically the terms "firewall" or "gateway" in the present disclosure (e.g. firewall/gateway 120A of FIG. 1) may refer to computing devices that communicate over wired network connections. In certain instances, however, a mesh node may include functionality consistent with a firewall or gateway. In certain instances, functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

Figure 2:
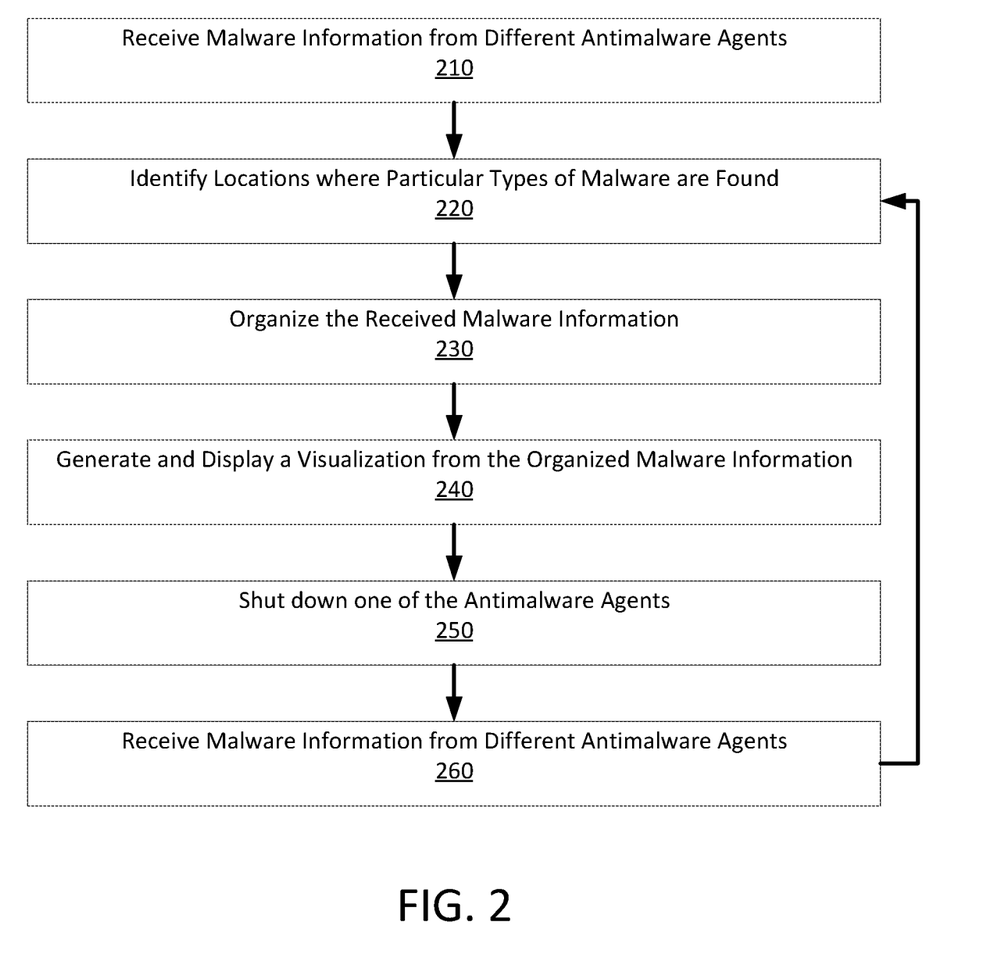
FIG. 2 illustrates an exemplary method consistent with the present disclosure that receives, organizes, and presents information received from different anti-malware agents or test computers.

FIG. 2 illustrates an exemplary method consistent with the present disclosure that receives, organizes, and presents information received from different anti-malware agents or test computers. FIG. 2 includes step 210 where information relating to malware may be received, for example, by anti-malware evaluation system 150 of FIG. 1. Step 220 of FIG. 2 may then identify locations where this malware was found. Alternatively or additionally, step 220 of FIG. 2 may identify a location where a data request originated, a network location affected by the malware, a malware type, a test type or test location, and/or a time stamp that identifies a time when a test detected malware. Next in step 230 the received information may be organized and a visualization of that data may be generated and displayed in step 240. Then, in optional step 250 of FIG. 2 a particular type of malware detection agent may be shut down (turned off) and additional malware test data/information may be received in step 260 reflecting the results of said adjustment. After step 260 program flow may move back to step 220 of FIG. 2, after which that information may be organized and used to generate additional visualizations.

The steps of FIG. 2 may be executed iteratively when the performance of different discrete anti-malware agents are evaluated. As such, step 250 of FIG. 2 may turn on an anti-malware agent that was previously shut down and then shut down a different anti-malware agent. The turning on or off of certain specific tests or test layers and collecting of test data that correspond to those changing conditions may be used to help identify strengths and weakness associated with different specific computing devices that perform anti-malware tests.

Figure 3:
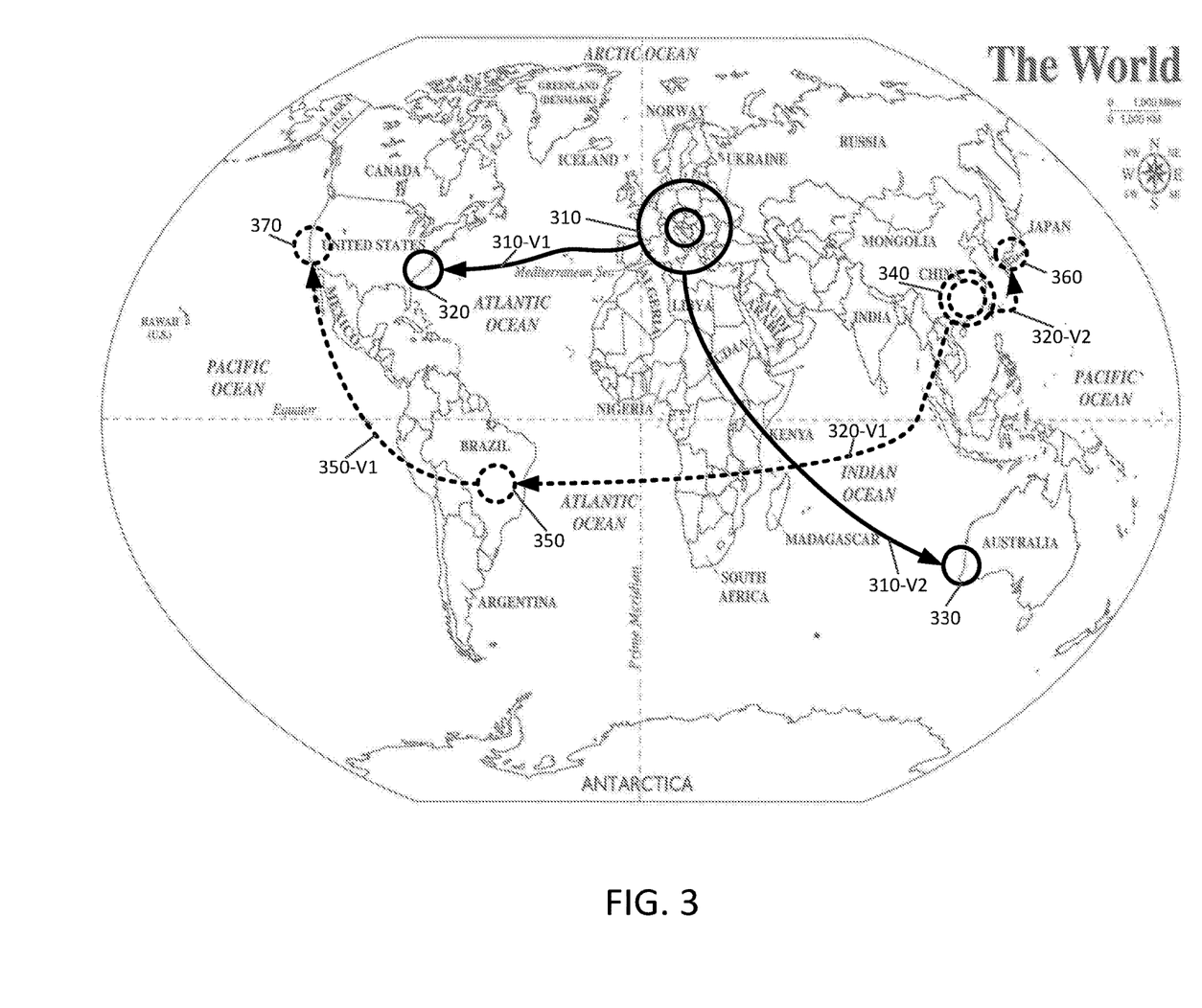
FIG. 3 illustrates a World map that may be used to identify and map locations where malware has been detected.

FIG. 3 illustrates a World map that may be used to identify and map locations where malware has been detected. FIG. 3 includes circles 310 that include a smaller circle and a larger circle. The size of a circle may correspond to an area where a particular type of malware has been detected. The smaller circle of circles 310 may identify a region where a particular virus has been identified and as that virus propagates through the internet, the larger circle of circles 310 may indicate that the virus has spread from central Europe into Western Europe and into Ukraine, for example. Characteristics of malware circles 310 (e.g. a line weight of circles 310, a color of circles 310, and the solid line of circles 310) may correspond to a type of malware or to a type of anti-malware agent that discovered malware or the scale or infectiousness thereof.

Item 310-V1 is a malware vector that indicates that the malware associated with circles 310 has moved to the Eastern United States as indicated by circle 320. Similarly, malware vector 310-V2 indicates that the malware associated with circles 310 has moved to Australia as indicated by circle 330 of FIG. 3. Visualizations consistent with the present disclosure may be used to identify locations where particular types of malware have been detected, may identify the extent of the spread of a particular type of malware in a region (e.g. Europe), and may include vectors that identify malware jumping from one region to another (e.g. from Europe to the Eastern U.S.A.). Various forms of data may be reflected by the weight, color, or pattern of a vector line. That data be access either through color coding, hovering over a particular vector, or clicking on the same. That data related to vectors (as well as circles 310) may be displayed in popup bubbles, pre-existing windows, or other forms of display.

FIG. 3 also illustrates a second type of malware that has been identified in China. This second type of malware may be identified graphically using the dashed circles (340, 350, 360, & 370) and dashed malware vectors (320-V1, 320-V2 & 350-V1) included in FIG. 3. Note that this second type of malware begins to spread in China as indicated by the circles 340 with increasing diameter. This second type of malware then spreads to Brazil via vector 320-V1 and to Japan via vector 320-V2. Note that the spread of this second type of malware to Brazil and to Japan are indicated by circles 350 and 360 respectively. FIG. 3 also illustrates that the second type of malware has spread to the Western U.S.A. via threat vector 350-V1. Note that the spread of this second type of malware to Brazil, to Japan, and to the Western U.S.A. are indicated by circles 350, 360, and 370. Through use of display data, circles, weight lines, color coding, vectors and the like, outbreaks of malware may be identified and contact traced throughout the world. The scale of the map shown in FIG. 3 may likewise be scaled up or down to reflect varying details of information that can range from countries, to states, to municipalities, to wide area networks, to local area networks, and even individual computing devices.

Figure 4:
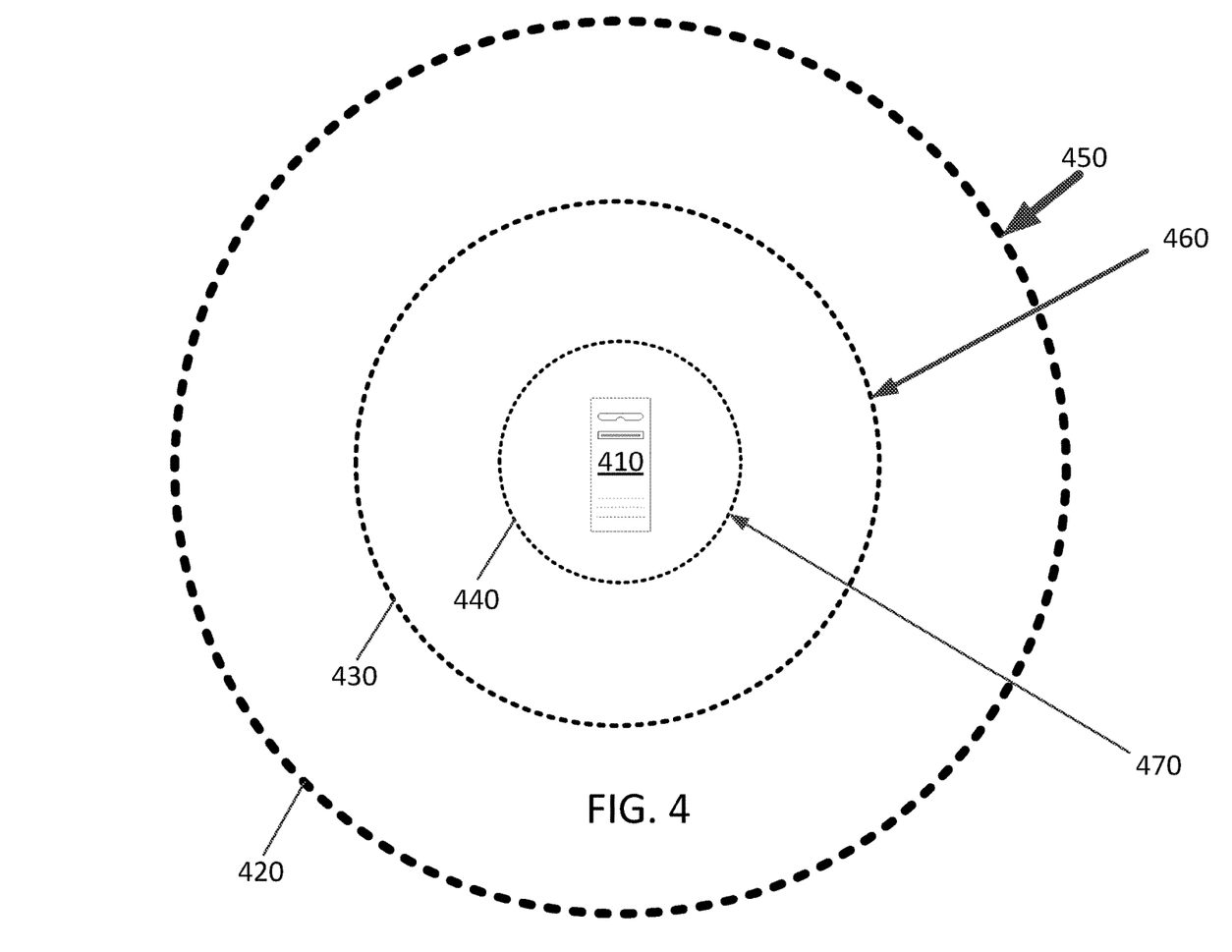
FIG. 4 illustrates a computer or datacenter that is protected from malware by several different layers of protection.

FIG. 4 illustrates a computer or datacenter that is protected from malware by several different layers of protection. These layers of protection that may be provided by anti-malware tools can be graphically displayed vis-à-vis computer or datacenter 410 is protected by an outer layer or shell 420, a middle layer 430, and an inner layer 440 of malware protection. Layers may be representative of not only particular tools, but also portions of network relative computing device or datacenter 410.

Arrowed lines 450, 460, and 470 represent different types of malware that are attempting to attack computer or datacenter 410. Note that each layer or shell of malware protection 420, 430, and 440 and each type of malware threat 450, 460, and 470 are represented by different line weights/widths in FIG. 4. Here again methods consistent with the present disclosure may alternatively use color codes or other forms of visual display instead of line weights/widths to identify different malware protection layers or different types of malware threats.

Note that FIG. 4 illustrates anti-malware layer 420 stopping malware 450 from attacking computer or datacenter 410, illustrates anti-malware layer 430 stopping malware 460 from attacking computer/datacenter 410, and illustrates anti-malware layer 440 stopping malware 470 from attacking computer/datacenter 410. Functions consistent with anti-malware layer 420 may be performed by a computing device at a computer network like firewall/gateway 120A or anti-malware agents operational at wireless mesh network 140 of FIG. 1. Functions that may be performed by anti-malware layer 420 may include content filtering using universal resource locators (URL), deep packet inspection (DPI), botnet filtering, firewall/gateway virus inspection scanning, and intrusion prevention. As such a firewall or gateway device may comprise a first layer of defense, where that firewall/gateway or computer performs a set of tests that may not include executing program code in an isolated secure environment (e.g. a sandbox computer).

One of ordinary skill in the art would understand that looking up a URL or domain associated with a request for data may be a first anti-malware test of a plurality of anti-malware tests. When a request to access data stored at a URL or domain is listed in a blacklist, the access request can be blocked by the firewall/gateway. In certain instances a list of URLs or domains associated with malware or other undesired content may be updated over time.

DPI refers to the scanning of data included in a set of data or data packets for patterns that are known to be associated with malware. Methods consistent with the present disclosure may perform DPI scans on unencrypted data or may perform DPI scans on data transmitted according via a secure socket layer (SSL) or communication session, such DPI scans may be referred to as DPI-SSL scans.

Botnet filtering may be performed by a processor executing instructions that check to see if data is being sent from a protected computer to computing devices outside of a protected network. For example, botnet filters may be used to identify and block outgoing communications that include passwords, credit card numbers, key strokes, or other proprietary or sensitive data.

The presence of a virus at a firewall/gateway may be identified using DPI or may be identified by identifying certain types of suspicious activity. For example, an anti-virus program may identify that as a piece of program code has been replicated or may identify that a piece of program code has been attached to a legitimate document.

Intrusion detection may include identifying that data being sent to computer outside of a protected network does not conform to a set of rules. For example, when a particular operation should send no more than X bytes of data to an external computer, intrusion detection software may identify when such an operation attempts to send more than X bytes of data to the external computer when that operation is performed. Accordingly, operations performed by anti-malware layer 420 may be limited to a set of specific types of operations.

The second layer, item 430 illustrated in FIG. 4 may perform a second set of anti-malware operations/tests and these operations may be performed at computing device that is remote from a particular protected network. Such remote computing devices can perform functions related to more advanced DPI, extended URL/domain name checking, email security, or include functions performed by an isolated computer (e.g. a sandbox computer). In certain instances, anti-malware functions performed at an external computer may overlap with functions performed at a firewall/gateway.

Additionally or alternatively, functions performed by an external computer may be tuned to identify recently identified threats or may identify threats for a first time. For example, a sandbox computer may be used to identify a new malware threat, DPI signatures associated with that new malware threat may be updated and stored at the remote computer, and the operation of DPI scanners at the remote computer may be updated to identify this new malware using DPI signatures. In certain instances, the remote computer may have access to a larger set of malware associated DPI signatures that a set of malware signatures currently stored at a firewall.

Similarly an external computer may be aware of URLs/domains that recently have been assigned a bad reputation at a time when a firewall currently store no data identifying that these URLs/domains have been assigned the bad reputation. Over time, of course recently identified DPI patterns or URLs/domains may be sent to firewalls such that operations of those firewalls can be enhanced overtime. Suspicious activity can also be identified by computers that are remote to a firewall or secure network.

Such suspicious activity can be performed by an isolated computer (e.g. a sandbox computer) that allows computer data be manipulated or executed by a processor. Suspicious activity identify by a sandbox computer may include identifying that program code has changed state (e.g. from non-executable code to executable code), that may include overwriting certain portions of memory that should not be overwritten under normal circumstances, may include identifying that a certain set of program code is attempting to send data to another computer in violation of a rule, or by identifying that a set of computer data performs a function of self-replication.

Computers external to a computer network may also be used to perform security functions that test email for threats. Such email tests may identify whether an email is hosted on an external server or by a computer inside of a protected network, data sent to or from particular email addresses or domains may be tested. In such instances, tests performed by this external computer may include DPI performed on email or email attachments, URL/domain name checks on attachment or links that are included in email, or may include allowing data included in an email or email attachment to be processed or executed by an isolated sandbox computer. As such, operations performed at layer 430 of FIG. 4 may include any form of malware test desired or that is configured to be performed at the external computer. Such external computers may be computers accessible via the Internet and such external computers may be located in the Cloud.

The third layer, item 440 of FIG. 4 that may include software operational on an endpoint device that tests computer data to see if it includes malware. Endpoint devices include computers, laptops, tablet computers, smartphones, or any computing device that may not always be contained within a secure network. As such, endpoint devices can be personal computers or general purpose computing devices that do not provide services for other computers. Endpoint devices may be computing devices 120B-120E or 140E & 140F of FIG. 1. Endpoints may, thus, be client devices that do not provide the functionally of computer server or firewall/gateway for other client devices. Even though endpoint devices may not provide functionality of a firewall or gateway for other client devices, endpoint devices may be configured with a software firewall that performs tests on computer data received by an endpoint device. Tests performed by such a software firewall may include URL/domain name reputation checking, DPI scanning, antivirus tests, and anti-bot testing.

Since the third layer 440 of testing includes tests that may be performed at an endpoint device, this third layer 440 may also protect computers from malware even when those computers are not contained within a protected network. Functionality that may also be associated with this third layer 440 of protection includes rolling back a software configuration at an endpoint computer. Such a rollback may restore a software configuration at an endpoint computer to a state that is free of malware after that endpoint computer has been compromised by malware. In such instances the restored software configuration may be equivalent to a software configuration at the endpoint device from a point in time before the malware compromised the endpoint computer.

In certain instances, protection layer 440 of FIG. 4 may also include functionality that sends computer data to a computer in the Internet or cloud that performs additional tests. Such additional test may be consistent with tests performed by protection layer 430 that were previously discussed. As such, protection layer 440 may perform software firewall functions that are similar to protections provided by a firewall of protection layer 420. Software functionality consistent with protection layer 440 may be performed when an endpoint computer is contained within a secure network when three different protection layer (420, 430, and 440) each operate to prevent malware from attacking or infecting computing devices. Alternatively, when an endpoint computer is not located within a protected network, functionality consistent with layer 440 or consistent with both layer 440 and 430 may be performed.

As attacks may be identified from information received from malware agents at various locations, malware threats 450, 460, and 470 may be illustrated as being stopped by or passing through a protection layer/shell not only as shown in FIG. 4 but in the context of a methodology like that disclosed in FIG. 2. As previously mentioned threat 450 is stopped by protection layer 420, thread 460 is stopped by protection layer 430, and threat 470 is stopped by protection layer 470. Illustrations consistent with FIG. 4 may be generated in real-time or in near-real-time as threat data is collected by monitoring computers (e.g. anti-malware evaluation system 160 of FIG. 1) over time. Such illustrations may be dynamic and may show threats 450, 460, and 470 moving toward and through or toward a protection both locally and globally as a result of evaluation like that of FIG. 2.

Method and apparatus consistent with the present disclosure may be used to identify that a certain type of threat is targeting one or more particular computer networks. In an instance when the first protection layer 420 is observed as currently not stopping a particular type or instance of malware, yet the second layer 430 is observed as currently stopping that particular type or instance of malware, functionality at protection layer 420 may be updated to include tests or data that allow protection layer 420 to identify this particular type or instance of malware. In such an instance a processor executing instructions of tests performed by protection layer 430 may identify that DPI signature data should be provided to firewalls executing tests performed by protection layer 420.

This processor may then cause these identified DPI signatures to be sent to particular firewalls such that those particular firewalls could identify a particular type or instance of malware. Such an automatic functionality could reduce an amount of work that need be performed at a remote computer at the Internet or cloud by updating anti-malware capabilities at firewall or software firewall dynamically, for example, when a load factor at the remote computer increases to a threshold level. Because of this, analytical tools like the methodology of FIG. 2 and associated with the present disclosure may be used to balance an amount of work performed by computing devices that reside at any protection layer. Furthermore, threat data and generated graphical data may be stored for later reference and this data may be reviewed by intelligent machine processes or by humans when those machines or humans identify patterns associated with the spread of malware.

Figure 5:
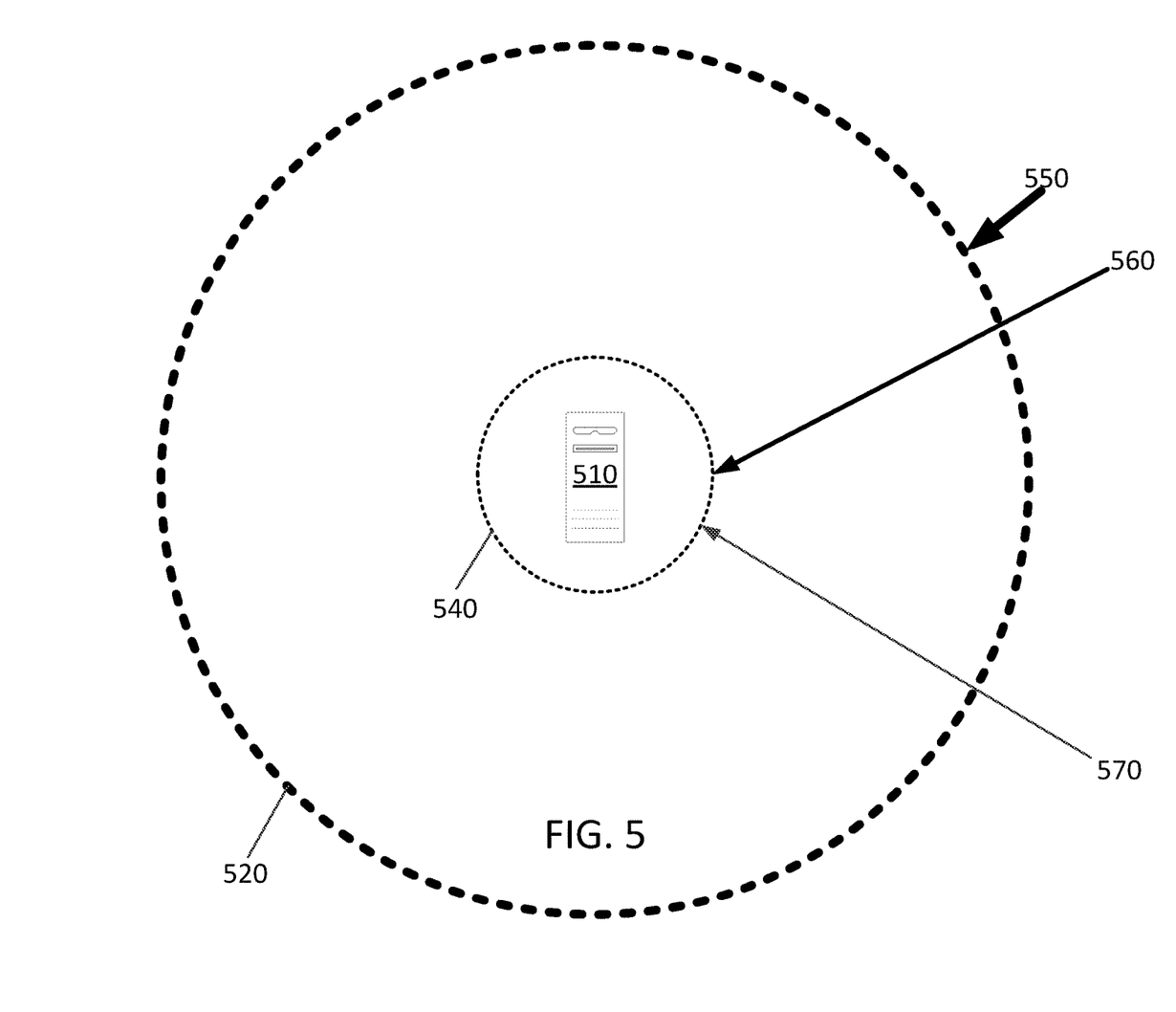
FIG. 5 illustrates a computing device or computer network that is currently protected by two of the three protection layers of FIG. 4.

FIG. 5 illustrates a computing device or computer network that is currently protected by two of the three protection layers of FIG. 4. FIG. 5 includes protection layer 520 that may provide protection consistent with protection layer 430 of FIG. 4 and protection layer 540 that may provide protection consistent with protection layer 440 of FIG. 4. FIG. 5 also includes computer or computer network 510 protected by protection layers 520 and 540. The illustration depicted in FIG. 5 may have been generated using data from anti-malware agents after the second protection layer 430 of FIG. 4 had been disabled (turned off) as discussed in respect to step 250 of FIG. 2.

Tools consistent with evaluating current conditions of the movement of malware through a protection infrastructure may include the ability to turn on or turn off any protection layer when the performances of one or more of a set of protection layers are evaluated. Such an analysis tools may be used to improve the operation of a multi-layer protection system by optimizing which layer should perform one or more types of tests versus another protection layer. Tools consistent with the present disclosure may include a user interface from which settings or conditions may be entered or identified. One of these settings or conditions may cause the functionality of a protection level to be disabled. The disabling or enabling of a particular protection layer test capabilities may be performed by an authorized user entering information into a user interface. A particular protection layer may be disabled at one or more specific networks or protection layers may be disabled throughout an area according to user input.

Data analysis methods consistent with the present disclosure may be used to generate and display visual representations of in real-time or near-real-time threat data that could not otherwise be interpreted by people. Visualizations may be generated that show the movement of malware across the entire World as that malware spreads. Visualizations consistent with the present disclosure may allow users to view the movement of malware through a region or may allow users to identify what types or variants of malware are currently attacking particular individual networks. For example visualizations may depict the movement of malware in a map of the entire World, such as the map illustrated in FIG. 3. Visualizations may identify malware attacks that are occurring in a particular region (country, state, or municipality), or may illustrate malware attacking a particular network, such as a local area network (LAN) or wide area network (WAN) of a particular company. As such, a user interface may receive inputs that identify a particular region or a particular network and that cause a visualization to display malware information according to those user inputs.

When methods or apparatus consistent with the present disclosure identify that variants of a particular type of malware are currently being deployed, anti-malware protection tests at certain levels of a multi-level anti-malware system may not be able to identify each and every variant form of a particular type of malware. In such instances, a number of remote computers located within a region may be increased to keep up with increased demands for being able to identify a new malware variant.

For example, a variant of a first malware instance may be easily identified using DPI when a second variant of the first malware instance would evade detection by DPI inspection. This can occur, when a virus is packaged within different types of computer data or when executable code of a virus is encrypted or hidden by code that causes the virus to be unpacked from other computer data. In instances when many variants of a particular type or instance of malware are propagating through computer networks, an increase in an amount of work required to identify these threats may be required. When a workload at a particular computing device increases to or beyond a threshold level, additional computers capable of performing tests may be directed to analyzing computer data for potential threats.

Figure 6:
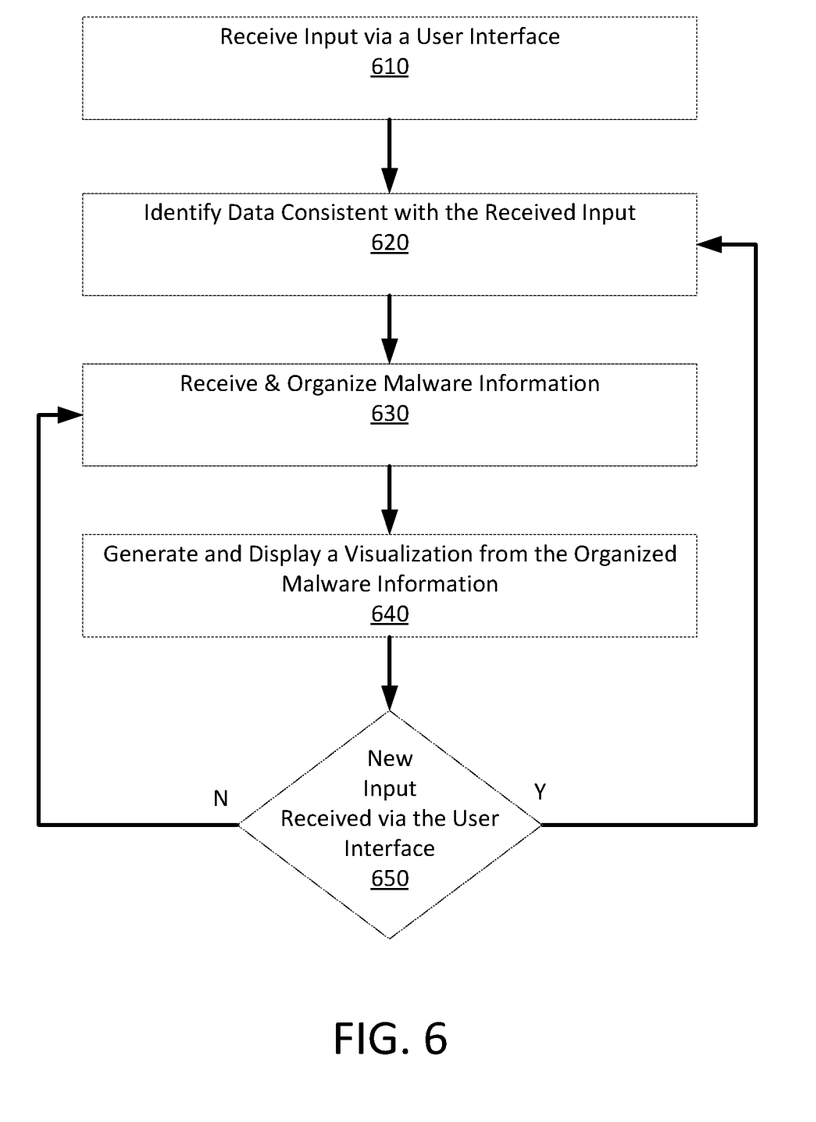
FIG. 6 illustrates various different steps that may be performed by methods or apparatus consistent with the present disclosure as a user interacts with a user interface consistent with the present disclosure.

FIG. 6 illustrates various different steps that may be performed by methods or apparatus consistent with the present disclosure as a user interacts with a user interface consistent with the present disclosure. FIG. 6 begins with step 610 where an input may be received via a user interface. The input received in step 610 of FIG. 6 could identify a region (the World, a country, a state, a city) or could identify a particular network, sub-net, or computing device. When a user input identifies a particular network, that network could be associated with a network that the user is chartered to support. For example, an administrator of a network associated with company ABC could enter a selection that results in visualizations being generated that identify malware threats that are currently affecting the computer network of company ABC.

Next step 620 may identify data that is consistent with a received input and then malware data or information may be received and organized in step 630 of FIG. The data received and organized in step 630 may be data consistent with the input received in step 610. For example, a user may have selected to view malware activity currently impacting computers in New York State or at government organizations in Washington D.C. and malware data associated with a selection may be used to generate and display a visualization of malware information in step 640 of FIG. 6. Visualizations generated in step 640 of FIG. 6 may be consistent with the visualizations illustrated in FIG. 3, 4, or 5 of this disclosure.

Here again, these visualizations may use various colors or line weights when illustrating the spread of different types or instances of malware. After step 640 program flow moves to determination step 650 that identifies whether a new input has been received via the user interface. When step 640 identifies that no new input has been received via the user interface, program flow may move back to step 630 where data is received and organized according to a current set of selections or inputs, after which an updated visualization can be generated and displayed in step 640. When determination step 650 identifies that a new input has been received via the user interface, program flow may move back to step 620, where data consistent with the newly received input may be identified. A change in an input or selections received via the user interface may cause malware data associated with a different area or with a different particular network to be organized and displayed in a generated visualization.

Data sent through networks of any kind may be analyzed for malware threats. Such networks may include cellular networks, networks associated with access or email providers, corporate data networks, or home data networks. In certain instances, malware threat data may identify a type of communication that is currently spreading a form of malware. For example, email or data sent via a particular cellular provider may be identified as a currently critical threat vector. Such determinations may result in warning message being sent to user devices that identify that a certain type of malware is spreading and these messages may be used to warn users not to open certain attachments.

Figure 7:
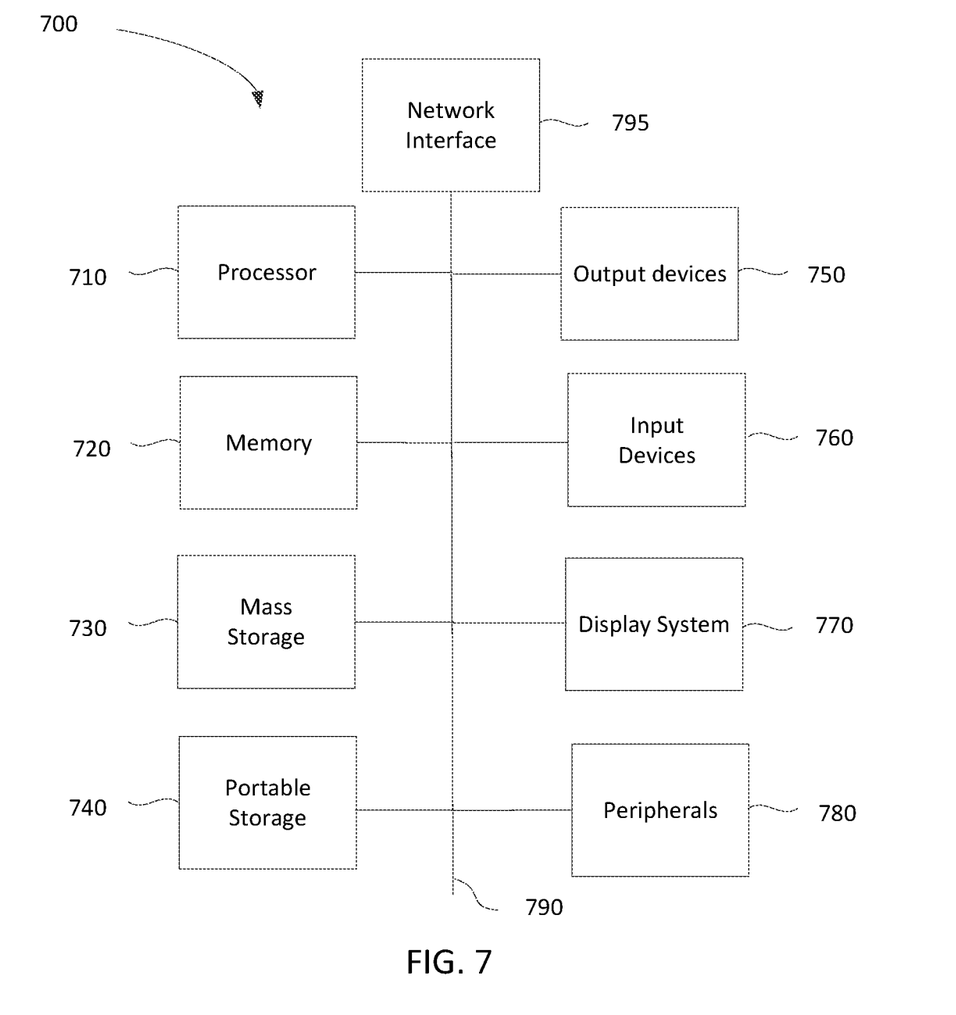
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795. The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A system for tracking and preventing malware from spreading, the system comprising:
    a malware test data evaluation computer that receives malware test data from computing devices associated with a plurality of test layers, wherein the test data received by the malware test data evaluation computer includes a first and a second set of malware test data;
    a first set of computing devices of a first test layer of the plurality of test layers that perform a first set of malware tests and that send the first set of malware test data to the evaluation computer, the first set of malware test data identifying a first set of malware types detected by the first set of computing devices; and
    a second set of computing devices of a second layer of the plurality of test layers that perform a second set of malware tests and that send the second set of malware test data to the evaluation computer, the second set of malware test data identifying a second set of malware types detected by the second set of computing devices, wherein the evaluation computer:
    evaluates the received test data to identify the first set of malware types detected by the first set of computing devices and the second set of malware types detected by the second set of computing devices,
    generates a visualization that illustrates:
        a first set of malware test vectors that identify the first set of malware types,
        the first set of malware test vectors stopping at the first test layer based on the first set of computing devices detecting and stopping the first set of malware types,
        a second set of malware test vectors that identify the second set of malware types, and
        the second set of malware test vectors stopping at the second test layer based on the second set of computing devices detecting and stopping the second set of malware types,
    displays the visualization on a display, and
    updates information displayed on the display over time.

2. The system of claim 1, further comprising a third set of computing devices of a third layer of the plurality of test layers that perform a third set of malware tests and that sends a third set of malware test data to the evaluation computer, the third set of malware test data identifying a third set of malware types detected by the third set of computing devices, wherein the generated visualization also illustrates:
    a third set of malware test vectors that identify the third set of malware types, and the third set of malware test vectors stopping at the third test layer based on the third set of computing devices detecting and stopping the third set of malware types.

3. The system of claim 2, wherein the evaluation computer:
    receives an input that identifies that the first set of malware tests should be disabled at the first set of computing devices,
    sends a command that prevents the first set of computing devices from performing the first set of malware tests,
    receives additional test data from the second and the third set of computing devices, and
    updates the visualization to identify:
        malware detected at the second set of computing devices that are stopped at the second test layer, and
        malware detected at the third set of computing devices that are stopped at the third test layer.

4. The system of claim 1, wherein the visualization includes a geographical map and locations at the geographical map where the first set of malware types and the second set of malware types were detected.

5. The system of claim 1, further comprising a memory at the second set of computing devices that stores deep packet inspection (DPI) signatures, wherein:
    at least one computing device of the first set of computing devices identifies DPI signature data characteristic of a new malware variant, and
    the DPI signature data characteristic of the new malware variant is sent to the second set of computing devices such that the second set of computing devices can identify the new malware variant by matching DPI signatures generated on received data with the DPI signature data characteristic of the new malware variant.

6. A method for tracking and preventing malware from spreading, the method comprising:
    receiving a first set of malware test data from a first set of computing devices associated with a first test layer of a plurality of test layers;
    receiving a second set of malware test data from a second set of computing devices associated with a second test layer of the plurality of test layers;
    generating a visualization that illustrates:
        a first set of malware test vectors that identify a first set of malware types that were detected by execution of program code at the first set of computing devices,
        the first set of malware test vectors stopping at the first test layer based on the program code executed at the first set of computing devices detecting and stopping the first set of malware types,
        a second set of malware test vectors that identify a second set of malware types that were detected by execution of program code at the second set of computing devices, and
        the second set of malware test vectors stopping at the second test layer based on the program code executed at the second set of computing devices detecting and stopping the second set of malware types;

displaying the visualization on a display; and updating information displayed on the display over time.

7. The method of claim 6, further comprising receiving a third set of malware test data from a third set of computing devices, wherein the visualization also illustrates:

a third set of malware test vectors that identify a third set of malware types associated with a third test layer of the plurality of test layers, and the third set of malware test vectors stopping at the third test layer based on the third set of computing devices detecting and stopping the third set of malware types.

8. The method of claim 7, further comprising:

receiving an input that identifies that the first set of malware tests should be disabled at the first set of computing devices;

sending a command that prevents the first set of computing devices from performing the first set of malware tests;

receiving additional test data from the second set and the third set of computing devices, and updating the visualization to identify:

malware detected at the second set of computing devices that are stopped at the second test layer, and malware detected at the third set of computing devices that are stopped at the third test layer.

9. The method of claim 6, wherein the visualization includes a geographical map and locations at the geographical map where the first set of malware types and the second set of malware types were detected.

10. The method of claim 9, further comprising:

identifying areas associated with the spreading of a detected malware type associated with the first set or the second set of malware types, wherein the visualization includes one or more geometric shapes associated with the detected malware type and sizes of the one or more geometric shapes correspond to a first location of the geographic map currently affected by the detected malware type;

identifying that the detected malware type has spread to a second geographical location; and updating the visualization to include a vector that illustrates that the detected malware type has spread from the first location to the second geographical location.

11. The method of claim 6, further comprising storing deep packet inspection (DPI) signatures in a memory at the second set of computing devices, wherein:

at least one computing device of the first set of computing devices identifies DPI signature data characteristic of a new malware variant, and the DPI signature data characteristic of the new malware variant is sent to the second set of computing devices such that the second set of computing devices can identify the new malware variant by matching DPI signatures generated on received data with the DPI signature data characteristic of the new malware variant.

12. The method of claim 6, wherein the visualization includes a map and locations where respective types of malware were identified as being detected at a first point in time, and further comprising:

receiving additional test data at a second point in time that is after the first point in time; and updating the visualization to include updated location information on the map, the updated location information providing an indication of a movement of at least one malware type of a plurality of malware types from a first location on the map to a second location on the map.

13. The method of claim 6, wherein the generation of the visualization also includes identifying colors for illustrating respective members of the first set of malware test vectors and the second set of malware test vectors, wherein the visualization includes the identifying colors for each of the respective members of the first and the second set of malware test vectors.

14. A non-transitory computer-readable storage medium having embodied thereon a program executable by a computer processor to implement a method for tracking and preventing malware from spreading, the method comprising:

receiving a first set of malware test data from a first set of computing devices associated with a first test layer of a plurality of test layers;

receiving a second set of malware test data from a second set of computing devices associated with a second test layer of the plurality of test layers;

generating a visualization that illustrates:

a first set of malware test vectors that identify a first set of malware types that were detected by execution of program code at the first set of computing devices, the first set of malware test vectors stopping at the first test layer based on the program code executed at the first set of computing devices detecting and stopping the first set of malware types, a second set of malware test vectors that identify a second set of malware types that were detected by execution of program code at the second set of computing devices, and the second set of malware test vectors stopping at the second test layer based on the program code executed at the second set of computing devices detecting and stopping the second set of malware types;

displaying the visualization on a display; and updating information displayed on the display over time.

15. The non-transitory computer-readable storage medium of claim 14, the program further executable to receive a third set of malware test data from a third set of computing devices, wherein the visualization also illustrates:

a third set of malware test vectors that identify a third set of malware types associated with a third test layer of the plurality of test layers, and the third set of malware test vectors stopping at the third test layer based on the third set of computing devices detecting and stopping the third set of malware types.

16. The non-transitory computer-readable storage medium of claim 15, the program further executable to:

receive an input that identifies that the first set of malware tests should be disabled at the first set of computing devices;

send a command that prevents the first set of computing devices from performing the first set of malware tests;

receive additional test data from the second set and the third set of computing devices, and update visualization that to identify:

malware detected at the second set of computing devices that are stopped at the second test layer, and malware detected at the third set of computing devices that are stopped at the third test layer.

17. The non-transitory computer-readable storage medium of claim 14, wherein the visualization includes a geographical map and locations at the geographical map where the first set of malware types and the second set of malware types were detected.

18. The non-transitory computer-readable storage medium of claim 17, the program further executable to:
   identify areas associated with the spreading of a detected malware type associated with the first set or the second set of malware types, wherein the visualization includes one or more geometric shapes associated with the detected malware type and sizes of the one or more geometric shapes correspond to a first location of the geographic map currently affected by the detected malware type;
   identify that the detected malware type has spread to a second geographical location; and
   update the visualization to include a vector that illustrates that the detected malware type has spread from the first location to the second geographical location.

19. The non-transitory computer-readable storage medium of claim 14, wherein:
   at least one computing device of the first set of computing devices identifies DPI signature data characteristic of a new malware variant, and
   the DPI signature data characteristic of the new malware variant is sent to the second set of computing devices such that the second set of computing devices can identify the new malware variant by matching DPI signatures generated on received data with the DPI signature data characteristic of the new malware variant.

20. The non-transitory computer-readable storage medium of claim 14, wherein the visualization includes a map and locations where respective types of malware were identified as being detected at a first point in time, the program further executable to:
   receive additional test data at a second point in time that is after the first point in time; and
   update the visualization to include updated location information on the map, the updated location information providing an indication of a movement of at least one malware type of a plurality of malware types from a first location on the map to a second location on the map.

\* \* \* \* \*